United States Patent Office 3,285,820
Patented Nov. 15, 1966

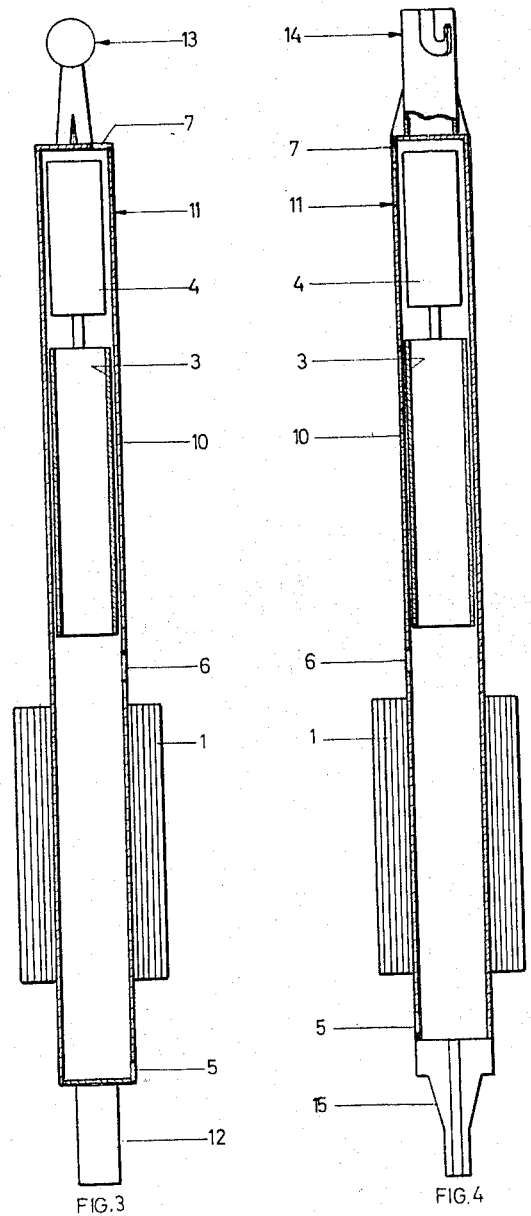

3,285,820
NUCLEAR REACTORS
Louis H. J. Tollet and Pierre E. J. M. Maldague, Brussels, Belgium, assignors to Societe Anglo-Belge Vulcain S.A., Brussels, Belgium
Filed Aug. 2, 1965, Ser. No. 476,637
8 Claims. (Cl. 176—28)

This application is a continuation-in-part of our earlier filed, copending application, Serial Number 174,794, filed February 21, 1962, now abandoned.

In nuclear reactors, the insertion of the fuel assemblies in the core and the removal thereof are complicated, because they generally involve several successive operations, owing to the presence of various members such as control rods, or shutoff rods, with their drive and controlling mechanisms.

The present invention provides an assembly of reactor elements which includes a support tube having upper and lower ends, means at at least one of said ends for supporting and maintaining the position of the tube within a reactor vessel, fuel elements carried by the tube above its lower end, a liquid port, e.g., inlet or outlet, in the tube below the fuel elements, a liquid port in the tube above the fuel elements, a drive mechanism carried by the tube, a reactivity control member carried by the tube and connected with the drive mechanism for actuation thereby, the support tube and the fuel elements, driving mechanism and reactivity control member carried by the the support tube being characterized by the quality of being handleable as a united assembly, whereby the dismantling and remounting of the core of a reactor equipped with such an assembly can be accomplished without separately removing therefrom the fuel, reactivity control member and the driving mechanism.

In the accompanying drawings, in which like reference numerals are applied to like parts:

FIGURES 3 and 4 show sectional, partially diagrammatic views of an assembly as represented in FIGURE 1 with modified end fittings.

Figures 1, 2:
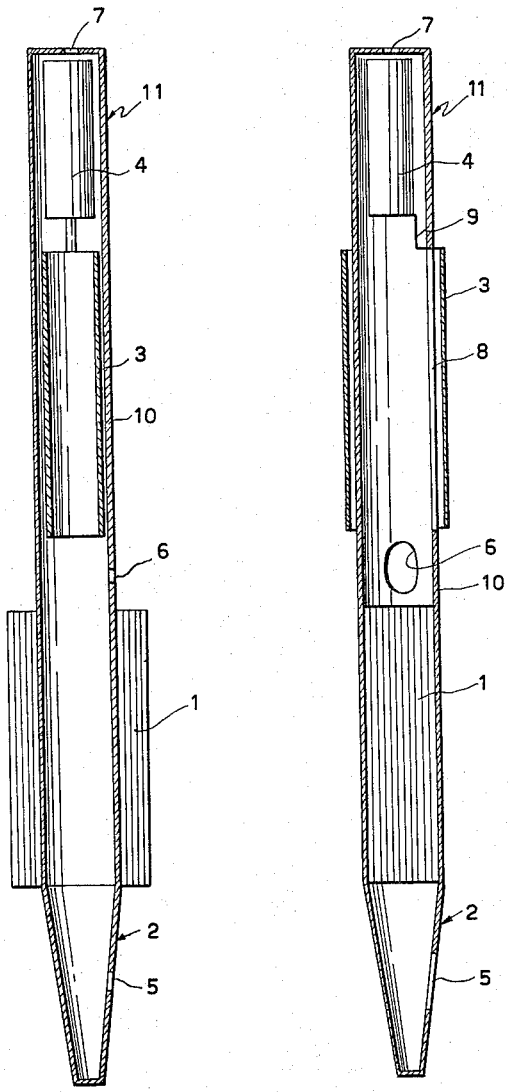
FIGURE 1 is a sectional, partially diagrammatic view of a first embodiment of the invention.
FIGURE 2 is a sectional, partly diagrammatic view of a second embodiment of the invention.

FIGURE 1 shows an assembly of reactor elements, comprising a cylindrical support tube 10 having a circular cross-section, a lower end 2 and an upper end 11. Lower end 2 has tapering sides for supporting and positioning tube 10 within a reactor vessel. There are a plurality of fuel elements 1 carried by the tube on the exterior thereof above lower end 2. In the tube 10, below the fuel elements, there is an inlet for a liquid that may be a moderator. Above the fuel elements is an outlet for the liquid, such as at 6 or 7. A drive mechanism 4, e.g. electric motor, pneumatic or hydraulic cylinder, solenoid or other prime mover, is carried by the tube at any convenient location, such as at upper end 11. Drive mechnism 4 is provided for actuating a reactivity control member, such as shutoff or control rod 3. In this figure the control member is a tubular cylinder and is carried by the tube 10 in generally concentric relationship therewith. Control member 3 is connected with the drive mechanism 4 through any suitable means known to persons skilled in the art. An example of a drive mechanism adapted to be carried in a tubular support such as tube 10, is shown in our copending application Serial No. 174,793, filed February 21, 1962, now U.S. Patent Number 3,212,981.

FIGURE 2 shows a mode of carrying the invention into effect according to which the fuel elements 1 are placed inside the tube 10. As in the above embodiment, tube 10 is provided with lower and upper ends 2 and 11, respectively. FIGURE 2 also shows an inlet 5 and outlets 6 and 7 for a liquid which, in the present embodiment, serves to extract the heat generated in the fuel elements. The drive mechanism 4 is located above the fuel elements as in FIGURE 1; however, the reactivity control member is a control rod 3, which has a completely circular cross-section and surrounds tube 10 in concentric relationship therewith. Control rod 3 is connected with mechanism 4 by a connecting member 9 through a longitudinal passage 8. The drive mechanism 4 or the portion thereof which carries connecting member 9 may be located on the outside of support tube 10 while still being carried thereby; and in such a case, the passage 8 is not needed.

FIGURE 3 shows an assembly like that described in FIGURE 1 in which the means for supporting and positioning the tube 10 comprises a head 13 and a concentric tube 12 which is of lesser diameter than support tube 10. Concentric tube 12 is attached to the lower end of tube 10, while the head 13 is attached to the upper end thereof. In the embodiment shown in FIGURE 3 the top of the head 13 has essentially a spherical shape.

Another embodiment has a cylindrical head in place of the spherically shaped head. This embodiment is illustrated in FIGURE 4. This figure shows an assembly similar to those shown in FIGURES 1 and 3, but in this embodiment the assembly is provided with a cylindrical heal 14 and a foot 15 which is cruciform in cross-section.

Figure 5:
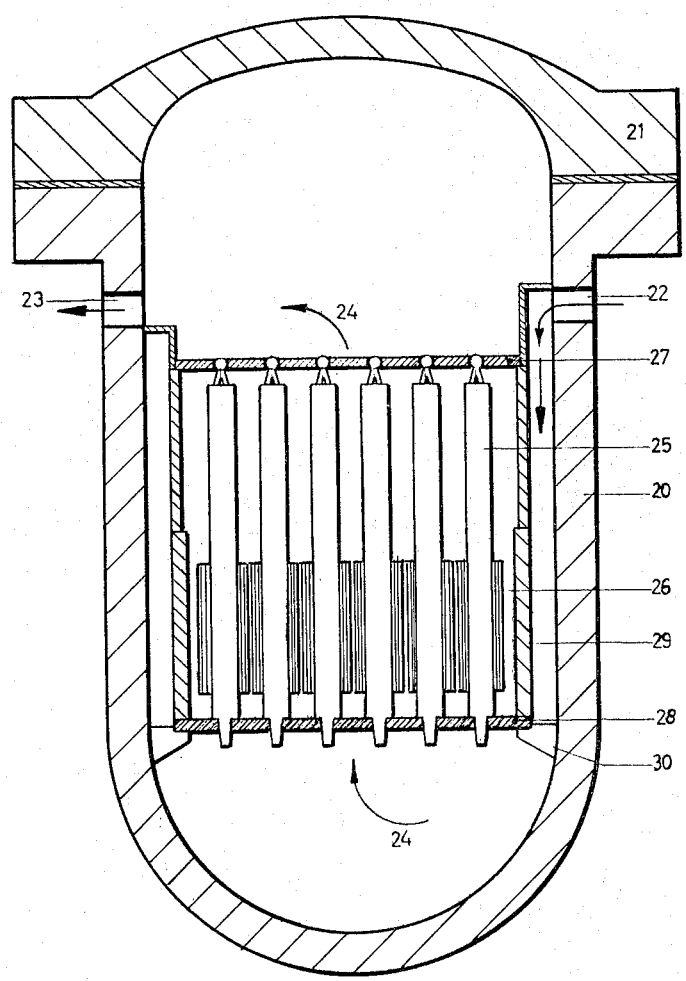
FIGURE 5 shows diagrammatically a reactor vessel provided with assemblies according to the present invention.

FIGURE 5 shows a reactor vessel 20 provided with assemblies 25 that are similar to those described in FIGURES 1 through 4. The reactor vessel is covered with a head 21 and is fitted with two openings, 22 and 23 respectively, which are used for the inlet and the outlet of the primary fluid through its upright side walls. Arrows 24 show the flow of the primary fluid through the vessel. The assemblies 25 include fuel elements 26. The supporting and positioning means of said assemblies are engaged by and are held between an upper core plate 27 and a lower core plate 28, said core plates being disposed and secured generally horizontally within vessel 20 and spaced apart from one another vertically. Each plate has holes corresponding respectivly to the shapes of the feet and the heads of the assemblies 25, said feet and heads being confined in said holes. Reference numeral 29 represents thermal shields resting on the plate 28; and reference numeral 30 represents means for supporting the lower core plate 28. With the head 21 and upper core plate 27 removed, the assemblies 25 may be removed from th reactor vessel 20 as a unit and may also be replaced in the reactor vessel as a unit.

It is obvious that various modifications may be made in the above embodiments without departing from the scope of the invention. Thus, the cylindrical shutoff or control rod 3 may have another profile or section, solid or hollow, or it may consist of a cage, of the squirrel cage type, for instance.

Among the various other modifications which can be made are changes in the nature and location of the means for supporting and maintaining the position of the assembly and its support tube 10 in the reactor vessel. Such means have been illustrated in various special forms, such as in the form of a lower end 2 with tapering sides (FIGURE 1), a concentric tube 12 extending below the lower end of the support tube (FIGURE 3), a spherical head 13 (FIGURE 3), a cylindrical head 14 with J-slot (FIGURE 4) and a foot 15 with cruciform cross-section (FIGURE 4). However, persons skilled in the art can readily substitute a wide variety of other means serving similar functions without departing from the scope of the invention. As an example, if the lower end of the tube 10 itself extends (without change in diameter) well below the fuel assemblies carried thereby, such extension may constitute the means for supporting and positioning the tube, it being necessary only to provide an upright cylindrical socket of corresponding diameter in the lower portion of the reactor vessel to receive the extension. A plurality of such sockets may hold a plurality of assemblies in a laterally-spaced pattern within the vessel and, if necessary, means such as a key and keyways in each socket and tube side-wall may be employed to keep the assemblies from turning.

It should also be understood that the means for supporting and maintaining the position of the assemblies and their support tubes in the reactor vessel may be provided at the lower ends only of each tube, at the upper end only, or at both ends. While it is preferred to provide such means at both ends, it is within the scope of the invention to provide means at the upper end only of each assembly or rigidly securing the assembly to an over-head suspension framework or plate in the reactor vessel, said framework or plate being adapted to receive a plurality of such assemblies in laterally spaced relationship to one another in any desired pattern. Conversely, it is also considered within the scope of the invention to provide means at the lower end only of each assembly for engaging any cooperating receiving means, such as sockets, in the lower portion of a reactor vessel, whereby a plurality of assemblies may be held upright in the vessel and prevented from swaying from side to side. The FIGURE 1 embodiment which includes a tube 10 having tapering side walls at its lower end is an excellent example of an assembly useful in the latter type of system, for the use of a tube receiving socket which tapers in a corresponding manner results in a cooperation between the socket and the lower end of the tube that has the effect of properly centering the tube as it is lowered into the socket. Such cooperation is exemplified in the relation between the tapered holes in lower core plates 28 and the tapered supporting and positioning means at the lower ends of the assemblies 25 in FIGURE 5.

While various illustrative embodiments and suggested modifications have been set out above, it is apparent that the invention is a broad one and is not limited to the exact forms thus disclosed, but rather embraces a broad range of alternative forms. Thus, the invention is to be regarded as pertaining to all forms and constructions falling within the scope of the appended claims.

What we desire to protect by United States Letters Patent is:

1. An assembly of reactor elements, comprising: a support tube having an upper end and a lower end with tapering sides for supporting and centering the tube within a reactor vessel, a moderator fluid inlet in said tube at said lower end, fuel elements carried by said tube above said lower end, a moderator fluid outlet in said tube above said fuel elements, a drive mechanism carried in said tube at the upper end thereof, a tubular reactivity control member carried by said tube in concentric relationship therewith and connected with said driving mechanism for actuation thereby, said support tube and the fuel elements, driving mechanism and reactivity control member carried by said support tube being characterized by the ability to be handled as a united assembly, whereby the dismantling and the remounting of a reactor equipped with such an assembly can be accomplished without separately removing therefrom the fuel, driving mechanism and reactivity control means.

2. An assembly of reactor elements, comprising: a support tube having upper and lower ends, means at at least one of said ends for supporting and maintaining the position of the tube within a reactor vessel, fuel elements carried by the tube above its lower end, a liquid port in the tube below the fuel elements, a liquid port in the tube above the fuel elements, a drive mechanism carried by the tube, a reactivity control member carried by the tube and connected with the drive mechanism for actuation thereby, the support tube and the fuel elements, driving mechanism and reactivity control member carried by the support tube being characterized by the quality of being handleable as a united assembly, whereby the dismantling and remounting of the core of a reactor equipped with such an assembly can be accomplished without separately removing therefrom the fuel, reactivity control means and their driving mechanism.

3. An assembly of reactor elements in accordance with claim 2 wherein said support tube has a circular cross-section.

4. An assembly of reactor elements in accordance with claim 2 wherein said drive mechanism is carried in said support tube.

5. An assembly of reactor elements in accordance with claim 2 wherein said reactivity control member has a circular cross-section.

6. An assembly of reactor elements in accordance with claim 2 wherein said means for supporting and maintaining the position of the tube within a reactor vessel are provided at both the upper and lower ends of said tube.

7. A nuclear reactor comprising: a reactor vessel having walls, a fluid inlet in said walls, a fluid outlet in said walls, a core, including a plurality of support tubes in said vessel, means secured within said vessel and engaging said support tubes for holding said tubes upright in a laterally spaced pattern, fuel elements carried by each tube above its lower end, a liquid port in each of said tubes below its fuel elements, a liquid port in each of said tubes above its fuel elements, a drive mechanism carried by each of said tubes, a reactivity control member carried by each of said tubes and connected with its drive mechanism for actuation thereby, said support tubes and the fuel elements, driving mechanisms and reactivity control members carried by said support tubes being characterized by the quality of being handleable as united assemblies, whereby the dismantling and remounting of the core of the reactor can be acomplished without separately removing therefrom the fuel, the reactivity control members and their driving mechanism.

8. A nuclear reactor comprising: a vessel having upright walls, a fluid inlet in said walls, a fluid outlet in said walls, a core in said vessel comprising a generally horizontally disposed lower core plate secured to said walls in said vessel, a generally horizontally disposed upper core plate secured to said walls within said vessel and vertically spaced with respect to said lower core plate, a plurality of support tubes in said vessel, said support tubes having upper and lower ends, supporting and positioning means at both ends of said support tubes for supporting and maintaining the position in said tubes within said vessel, a plurality of holes in each of said core plates corresponding to the shapes of the supporting and positioning means on said support tubes, said supporting and positioning means being confined in said holes, whereby said tubes are held upright in a laterally spaced pattern, fuel elements carried by each of said tubes above its lower end, a liquid inlet in each of said tubes below its fuel elements, a liquid outlet in each of said tubes above its fuel elements, a drive mechanism carried by each of said tubes, a reactivity control member carried by each of said tubes and connected with its drive mechanism for actuation thereby, said support tubes and the fuel elements, driving mechanisms and reactivity control members carried by said support tubes being characterized by the quality of being handleable as united assemblies, whereby the dismantling and remounting of the core of the reactor can be accomplished without separately removing therefrom the fuel, the reactivity control members and their driving mechanism.

No references cited.

REUBEN EPSTEIN, *Primary Examiner.*